United States Patent
Burba et al.

(10) Patent No.: US 9,350,804 B2
(45) Date of Patent: *May 24, 2016

(54) PEER-TO-PEER COMMUNICATION TO INCREASE DOWNLOAD THROUGHPUT

(71) Applicant: MICROSOFT TECHNOLOGY LICENSING, LLC, Redmond, WA (US)

(72) Inventors: Alexander Burba, Seattle, WA (US); Brandon Hunt, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/607,707

(22) Filed: Jan. 28, 2015

(65) Prior Publication Data
US 2015/0142893 A1   May 21, 2015

Related U.S. Application Data

(63) Continuation of application No. 13/714,010, filed on Dec. 13, 2012, now Pat. No. 8,959,152.

(51) Int. Cl.
G06F 15/16 (2006.01)
H04L 29/08 (2006.01)

(52) U.S. Cl.
CPC .......... *H04L 67/104* (2013.01); *H04L 67/1008* (2013.01); *H04L 67/1063* (2013.01)

(58) Field of Classification Search
USPC ................................. 709/202, 204, 217, 226
See application file for complete search history.

(56) References Cited

U.S. PATENT DOCUMENTS

| | | | |
|---|---|---|---|
| 7,330,893 B2 | 2/2008 | Qiu et al. | |
| 7,774,495 B2 | 8/2010 | Pabla et al. | |
| 7,882,231 B2 | 2/2011 | Burkard et al. | |
| 8,112,479 B2 | 2/2012 | Guan | |
| 8,134,931 B2 * | 3/2012 | Laroia ..................... | H04W 8/26 370/252 |

(Continued)

FOREIGN PATENT DOCUMENTS

EP   1821487 A1   8/2007

OTHER PUBLICATIONS

Horovitz, et al., "Collabory: A Collaborative Throughput Stabilizer & Accelerator for P2P Protocols", In Proceedings of the 2008 IEEE 17th Workshop on Enabling Technologies: Infrastructure for Collaborative Enterprises, Jun. 23, 2008, p. 6.

(Continued)

*Primary Examiner* — Liangche A Wang
(74) *Attorney, Agent, or Firm* — Aaron Chatterjee; Judy Yee; Micky Minhas

(57) ABSTRACT

Certain embodiments relate to use of aggressive peering requests, which enable a peer computing device to obtain desired digital content more quickly than typically possible in a P2P network. In certain embodiments, an aggressive peering request comprises a request that another peer computing device, to which the aggressive peering request is sent, dedicates substantially all of, or a disproportionately large amount of, its P2P resources to servicing a specific peer computing device. Other embodiments relate to identifying, based on accessed information, peer computing devices that are predicted to be available as an uninterrupted seed, and thus, can be used to increase download throughput in a P2P network.

19 Claims, 7 Drawing Sheets

(56) References Cited

U.S. PATENT DOCUMENTS

| | | | |
|---|---|---|---|
| 8,214,489 B2 | 7/2012 | Ballette et al. | |
| 8,340,044 B2* | 12/2012 | Laroia | H04W 72/02 370/319 |
| 2007/0245010 A1* | 10/2007 | Arn | H04L 67/1008 709/223 |
| 2012/0151051 A1 | 6/2012 | Zhang et al. | |
| 2012/0236712 A1* | 9/2012 | Park | H04W 36/22 370/230 |
| 2012/0250636 A1* | 10/2012 | Wang | H04W 72/08 370/329 |
| 2013/0059583 A1* | 3/2013 | Van Phan | H04W 72/04 455/435.1 |
| 2014/0057670 A1* | 2/2014 | Lim | H04W 8/005 455/509 |
| 2014/0172968 A1 | 6/2014 | Burba et al. | |

OTHER PUBLICATIONS

Anderson, et al., "The Computational and Storage Potential of Volunteer Computing", In Proceedings of the Sixth IEEE International Symposium on Cluster Computing and the Grid, May 16, 2006, pp. 8.

Chang, et al., "To Peer or not to Peer: Modeling the Evolution of the Internet's AS-level Topology". In Proceedings of 25th IEEE International Conference on Computer Communications, Apr. 2006, pp. 12.

International Search Report & Written Opinion mailed Mar. 18, 2014, in PCT Patent Application No. PCT/US2013/075164 filed Dec. 13, 2013, 11 Pages.

Office Action mailed Jul. 21, 2014, in U.S. Appl. No. 13/714,010, filed Dec. 13, 2012.

Notice of Allowance mailed Oct. 14, 2014, in U.S. Appl. No. 13/714,010, filed Dec. 13, 2012.

* cited by examiner

PEER-TO-PEER COMMUNICATION TO INCREASE DOWNLOAD THROUGHPUT

PRIORITY CLAIM

This application is a continuation of and claims priority to U.S. patent application Ser. No. 13/714,010, filed Dec. 13, 2012, which is incorporated herein by reference.

BACKGROUND

Digital content, such as a video game, is often available for direct download over the Internet from a digital content provider, thereby eliminating the need for a user to install such digital content on their computing device using an optical storage disc or some other data storage device. However, such digital content may comprise a large amount of data, and therefore may take a potentially significant amount of time to download in full. Additionally, a significant amount of digital content provider resources and network resources may be used to transfer the digital content from the digital content provider to the user's computing device, which can also be referred to as a client. The amount of time, digital content provider resources and network resources used to transfer such digital content is exacerbated when numerous computing devices attempt to download the same digital content at the same time, which often occurs when digital content is initially released or updated.

SUMMARY

Various embodiments disclosed herein can be used to improve download throughput in a peer-to-peer (P2P) network. Certain embodiments relate to the use of aggressive peering requests, which can be used to enable a first peer computing device to obtain desired digital content more quickly than is typically possible in a P2P network. In accordance with certain embodiments, an aggressive peering request comprises a request that another peer computing device, to which the aggressive peering request is sent, dedicates substantially all of, or a disproportionately large amount of, its P2P resources to servicing the first peer computing device. In accordance with certain embodiments, if a peer computing device accepts an aggressive peering request, it will terminate servicing other computing devices currently being serviced by the second peer computing device, decline requests to service other computing devices (even though the second peer computing device has the capacity to service the other computing devices), and/or allocate more bandwidth to servicing the first peer computing device than to servicing other computing devices. In accordance with certain embodiments, a central service is used to identify other peer computing devices of the P2P network that are candidates for dedicating substantially all of, or a disproportionately large amount of, its P2P resources to servicing the first peer computing device.

Typically, a peer computing device that is acting as a seed can stop seeding at any time, which may require a downloading peer computing device to identify other potential seeds and start a download process over. Certain embodiments described herein relate to identifying peer computing devices that are predicted to be available as an uninterrupted seed. Such embodiments can be used to increase download throughput in a P2P network by reducing the likelihood that a computing device will stop acting as a seed in the middle of a downloading session.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
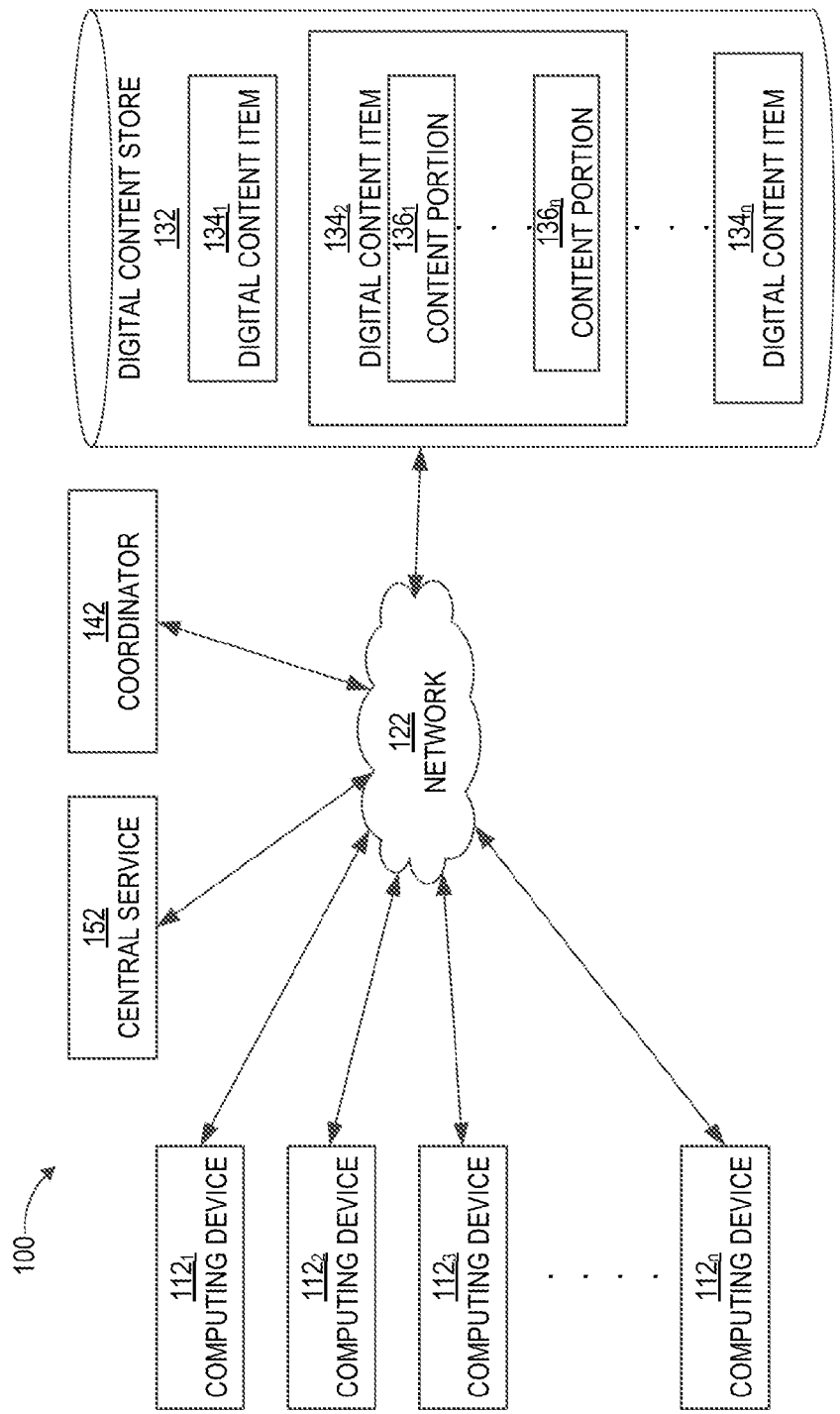
FIG. 1 shows an exemplary use environment with which at least some of the embodiments described herein can be implemented.

A peer-to-peer (P2P) network can be used to reduce the amount of digital content provider resources, network resources and the amount of time used to distribute digital content, such as a video game, to a plurality of computing devices. Conventionally, a peer computing device of a P2P network has been unable to exert any significant influence over other peer computing devices of a P2P network. Additionally, conventionally, a peer computing device provides substantially similar amounts of its P2P resources to each of the other peers it services. Further, conventionally, a peer computing device that is acting as a seed can stop seeding at any time, which can reduce the download throughput of the P2P network, because the downloading peer may need to identify other potential seeds and restart the download process.

Through use of aggressive peering techniques of specific embodiments described herein, a peer computing device can exert substantial influence over other peer computing devices. More specifically, using aggressive peering, a peer computing device may cause other peer computing devices to dedicate substantially all of, or a disproportionately large amount of, its P2P resources to servicing the peer computing device. In other embodiments described herein, various types of information can be maintained and accessed to identify computing devices that are predicted to be available as an uninterrupted seed. The above mentioned embodiments can be used to increase the download throughput in an P2P network, as will be appreciated from the description below.

Prior to discussing the above mentioned embodiments in more detail, an example embodiment of a use environment 100 is described with reference to FIG. 1. The exemplary use environment 100 comprises a plurality of computing devices $112_1, 112_2, 112_3 \ldots 112_n$, which can be referred to collectively as computing devices 112, and can be referred to individually as a computing device 112. Each computing device 112, which is configured to receive, process and present digital content, is associated with a corresponding user. In some instances, more than one computing device may be associated with a same user. For example, a user may have two or more of a video game console, a mobile device, a computer (e.g., laptop, desktop, tablet), a wearable device (e.g. head-mounted display), etc., and may consume digital content on each of these computing devices.

Each computing device 112 can be in communication with one or more digital content stores 132 (e.g., locations from which digital content may be downloaded) via a network 122 (e.g., computer network, cellular phone network, and/or any other suitable type of network). The digital content store 132 is depicted as storing a plurality of digital content items $134_1$, $134_2 \ldots 134_n$, which can be referred to collectively as digital content items 134, and can be referred to individually as a digital content item 134. The digital content store can be supported by a content delivery network (CDN), but is not limited thereto.

Each digital content item 134 comprises a plurality of content portions, examples of which are shown as content portions $136_1 \ldots 136_n$ for the digital content item 1342. Digital content items 134 may represent any suitable type of digital content, including but not limited to interactive content such as video games, interactive video, and social media. Other examples include, but are not limited to, movies, television shows and other videos, music, photographs, websites, etc. Likewise, content portions may take any suitable form, such as, but not limited to, specific portions of memory (e.g. memory locations, disk sectors, etc.), or, by extension, specific files, or portions thereof.

Each computing device 112 may also be in communication with one or more other peer computing devices 112 in a P2P arrangement for receiving digital content from peer computing devices. At any given time, the computing devices 112 that are participating in, or are available for, P2P communication can be referred to collectively as a swarm. A swarm is dynamic, in that computing devices can join or leave the swarm in response to users turning on and off their computing devices and/or users (or their computing devices) selectively enabling and disabling P2P communication capabilities. For a specific example, a computing device may temporarily disable all or some of its P2P capabilities so that resources, such as network, CPU and/or memory resources, can be used to preserve a user experience.

Where the computing devices 112 are capable of performing P2P transfers of digital content, each computing device 112 can also be referred to as a peer computing device 112 (or simply a peer or a node), and the entire use environment 100 can also be referred to as a P2P content distribution network (or simply a P2P network). In a P2P network, a plurality of peer computing devices 112 in a communications network have access to a P2P file sharing protocol and can use that protocol to try to obtain copies of particular digital content such as a file that is being distributed. The peer computing devices 112 in the network can each have one or more current connections using that protocol to others of the peer computing devices. Thus peer computing devices can join or leave the network as they drop or form connections to peer computing devices already in the network. The connections need not always be actively used for content distribution although the connections need to be suitable for doing so using the particular protocol, which may or may not use network encoding. The connections can either be one-way or two-way connections. It is possible that a given peer computing device 112 can be a member of more than one P2P network at a time.

FIG. 1 also shows a coordinator computing device 142, which can also be referred to as a coordinator node, or simply a coordinator. The coordinator 142 can collect and maintain information about the various computing devices 112, such as whether a computing device is participating in the P2P network and has any digital content to share. Additionally, the coordinator 142 can help peer computing devices 112 find other peer computing devices 112 that have desired digital content. The coordinator 142 can be, for example, a tracker, but is not limited thereto. While only one coordinator 142 is shown in FIG. 1, the P2P content distribution network 100 can include multiple coordinators 142.

A central service 152 is also shown in FIG. 1. The central service 152 is associated with a P2P network and can be used to collect and maintain information about all of the peer computing devices 112 that are participating in the P2P network. As will be described in additional detail below, the central service 152 can collect and maintain information about the digital content that each of the peer computing devices 112 of the P2P network possesses. Additionally, the central service 152 can collect and maintain information about historical and current data transfer rates and availability associated with the peer computing devices 112 of the P2P network. Accordingly, the central service 152 can include one or more programmable processors as well as network and other communication interfaces that enable the central service to communicate with peer computing devices, maintain and access information, and track statistics and other information relating to peer computing devices. Conventionally, P2P networks have typically lacked a centralized service, at least in part so that no individual person or company was responsible if unauthorized copies of copyrighted material were being distributed over the P2P network. However, in certain instances, a P2P network may actually be supported by a company, such as a game console company, because it benefits such a company. In such instances, it may be desirable and beneficial to the company, as well as the users of the peer computing devices, that a central service is maintained, e.g., to provide for faster and more efficient dissemination of new game releases and/or updates to an entire gaming community. This is just one example of why it may be beneficial to have a central service. Other benefits will be appreciated from the description below.

Aggressive Peering

Figure 2:
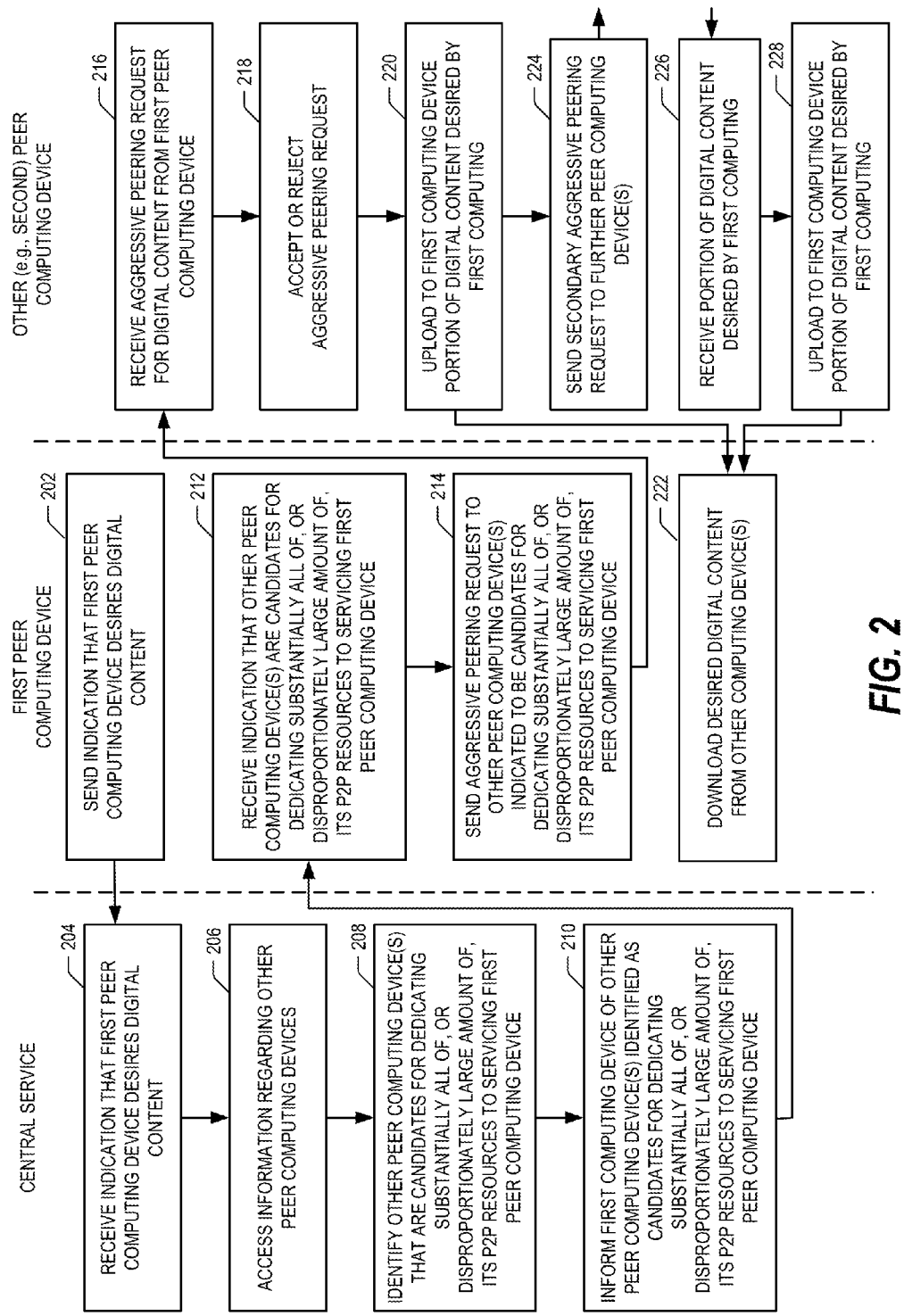
FIG. 2 shows a flow diagram depicting an embodiment of a method for improving download throughput in a P2P network through use of aggressive peering.

As mentioned above, certain embodiments described herein relate to the use of aggressive peering, which can be used to enable a peer computing device to obtain desired digital content more quickly than is typically possible in a P2P network. The high level flow diagram of FIG. 2, discussed below, is used to explain these embodiments. In FIG. 2, the steps associated with left most blocks are performed by a central service (e.g., 152 in FIG. 1) of a P2P network, the steps associated with the middle blocks are performed by a first peer computing device (e.g., $112_1$ in FIG. 1) of the P2P network, and the steps associated with the right most blocks are performed by another peer computing device (e.g., a second peer computing device $112_2$ in FIG. 1) of the P2P network. More generally, FIG. 2 will now be used to describe a method for improving download throughput in a P2P network through use of aggressive peering.

Referring to FIG. 2, this method can be initiated when a first peer computing device (e.g., $112_1$ in FIG. 1) indicates a desire to obtain digital content, and sends such an indication to a central service (e.g., 152 in FIG. 1). The desired digital content can either be an entire digital content item that includes a plurality of digital content portions (also referred to as digital content units), a specific digital content portion of a digital content item that includes a plurality of digital content portions, or a specific group of digital content portions of a digital content item. For brevity, digital content that a peer computing device desires will often be referred to herein as desired digital content.

As indicated at steps 204 and 206, respectively, the central service 152 receives the indication from the first peer computing device $112_1$, and accesses information regarding other peer computing devices. At step 208, the central service 152 identifies for the first peer computing device $112_1$, one or more other peer computing devices (e.g., a second peer computing device $112_2$) of the P2P network that are candidates for dedicating substantially all of, or a disproportionately large amount of, their P2P resources to servicing the first peer computing device $112_1$. Such candidates for dedicating substantially all of, or a disproportionately large amount of, their P2P resources to servicing the first peer computing device, can also be referred herein as "at least partially dedicated peer candidates". P2P resources, as the term is used herein, are resources that a peer computing device uses for P2P communications, including, but not limited to, CPU cycles, connections with other peer computing devices of a P2P network, and/or communication bandwidth with other peer computing devices of the P2P network.

In certain embodiments, after the central service 152 receives the indication that the first peer computing device $112_1$ desired digital content at step 204, the central service 152 determines whether the first peer computing device $112_1$ is authorized to send an aggressive peering request. Such a determination can be dependent on various criteria, including, but not limited to, the device state of the first peer computing device $112_1$, the immediacy of the data acquisition needs for the desired digital content, the service level (e.g., platinum, gold or silver) of the first peer computing device $112_1$, contributions made by the first peer computing device $112_1$, and/or monetary payments made by the user of the first peer computing device $112_1$. For a specific example, it may be that only peer computing devices that have paid for or have otherwise obtained a platinum level of service can take advantage of aggressive peering. For another example, it may be that aggressive peering is only allowed where a peer computing device needs the desired digital content with an immediacy that if not achieved, would degrade a user experience below a predetermined acceptable level. For still another example, it may be that the more a peer computing device has accepted aggressive peering requests, the more that peer computing device is authorized to send aggressive peering requests. These are just a few examples, which are not meant to be all encompassing.

There are various different types of information that the central service 152 can access at step 206, and there are various different manners in which the central service 152 can identify at least partially dedicated peer candidates at step 208. In order for information to be accessed at step 206, the information first needs to be collected. In certain embodiments, such information is collected and maintained by the central service 152. In other embodiments, multiple coordinators (e.g., 142 in FIG. 1) can collect subsets of such information corresponding to subsets of the peer computing devices, provide such information the central service 152, and the central service 152 can aggregate and store the information it receives.

For a specific example, the central service 152 can communicate with coordinators 142 and/or individual peer computing devices 112 to monitor and keep track of the digital content that the various peer computing devices 112 have and are willing to share with other peer computing devices 112. The central service 152 can also keep track of current and/or historical throughput information indicative of data transfers rates provided by individual peer computing devices of the P2P network. The central service 152 can additionally keep track of current and/or historical availability information indicative times when individual peer computing devices of the P2P network have been available as a seed. In specific embodiments, described in additional detail with reference to FIGS. 4 and 5, the central service 152 can monitor and keep track of availability information that is indicative of blocks of time that individual peer computing devices of the P2P network have historically been available as an uninterrupted seed for at least a specified amount of time. Based on such availability information, the central service 152 can predict when peer computing device(s) are available as uninterrupted seeds for at least the specified amount of time. The aforementioned types of information can be stored in memory and/or database(s) accessible by the central service 152.

Based on present time information, corresponding to the time at which the central service 152 receives an indication at step 204 that a peer computing device desires digital content, the central service 152 can identify at least partially dedicated peer candidates at step 208. The present time information can include, for example, the present time of day, the present day of the week and/or the present day of the year, but is not limited thereto.

In certain embodiments, a second peer computing device (e.g., $112_2$) will only be identified as an at least partially dedicated peer candidate for a first peer computing device (e.g., $112_1$), if that second peer computing device $112_2$ has at least a portion of the digital content desired by the first peer computing device $112_1$. This way, if an aggressive peering request (sent by the first peer computing device $112_1$) is accepted by a second peer computing device (e.g., $112_2$), the first peer computing device $112_1$ can almost immediately begin downloading at least some of the desired digital content. In specific embodiments, the central service 152 will attempt to identify, as at least partially dedicated peer candidates, peer computing devices that possess all, or a large portion of, the desired digital content. In other embodiments, there is no requirement that an at least partially dedicated peer candidate possesses at least a portion of the desired digital content. In certain embodiments, the central service 152 uses levels of availability and/or throughput as criteria for identifying at least partially dedicated peer candidates. These are just a few examples, which are not meant to be all encompassing. Additional and/or alternative criteria for identifying at least partially dedicated peer candidates at step 208 are also within the scope of an embodiment.

Still referring to FIG. 2, at step 210, the central service 152 informs the first peer computing device $112_1$ of one or more other peer computing devices that were identified, at step 208, as the at least partially dedicated peer candidates. The central service 152 can perform step 210 by sending a message including such information to the first peer computing device $112_1$. Such a message can include an instruction or recommendation that the first peer computing device $112_1$ send an aggressive peering request to one or more other peer computing devices that were identified as the at least partially dedicated peer candidates. In this manner, the central service 152 can effect or recommend the sending of an aggressive peering request from first peer computing device $112_1$ to one or more other peer computing devices.

As indicated at step 212, the first peer computing device $112_1$ receives, from the central service 152, an indication that one or more other peer computing devices were identified as being at least partially dedicated peer candidates (i.e., candidates for dedicating substantially all of, or a disproportionately large amount of, its P2P resources to servicing the first peer computing device). The first peer computing device $112_1$ can perform step 212 by receiving the message sent by the central service 152 at step 210. In accordance with an embodiment, such a message includes information that enables the first peer computing device $112_1$ to communicate directly with the other peer computing devices identified as the at least partially dedicated peer candidates. For example, the central service 152 can provide the first peer computing device $112_1$ with the IP addresses and port number of the other peer computing devices identified as the at least partially dedicated peer candidates. Additionally, or alternatively, the central service 152 can provide the first peer computing device $112_1$ with some other identifier that would enable the first peer computing device $112_1$ to communicate directly with the other peer computing devices identified as the at least partially dedicated peer candidates. In certain embodiment, the first peer computing device $112_1$ may use a look-up-table to convert an alternative identifier to an IP address and port number.

At step 212, the first peer computing device $112_1$ sends an aggressive peering request to at least one of the other peer computing devices that were indicated to be at least partially dedicated peer candidates. In alternative embodiments, the central service 152 can send an aggressive peering request to one or more at least partially dedicated peer candidates on the behalf of the first peer computing device $112_1$, in which case some of the above described steps need not be performed.

In certain embodiments, each aggressive peering request comprises a request that the other peer computing device, to which the aggressive peering request is sent, dedicates substantially all of its P2P resources to servicing the first peer computing device $112_1$ (or more generally, to servicing the peer computing device that sent the aggressive peering request, or servicing the peer computing device on which behalf the aggressive peering request was sent). In certain embodiments, when a second peer computing device (e.g., $112_2$) dedicates substantially all of its P2P resources to servicing the first peer computing device $112_1$, the second peer computing device $112_2$ is still capable of declining download requests received from other peer computing devices.

In other embodiments, each aggressive peering request comprises a request that the other peer computing device, to which the aggressive peering request is sent, dedicates a disproportionately large amount of its P2P resources to servicing the first peer computing device $112_1$ (or more generally, to servicing the peer computing device that sent the aggressive peering request, or servicing the peer computing device on which behalf the aggressive peering request was sent). In a P2P network, a seed is a peer computing device that has the digital content that is desired by another peer computing device, and is available and willing to source copies of the digital content (e.g., in response to a download request). Accordingly, a computing devices that is acting as a seed for multiple other peer computing devices can be said to be seeding multiple peer computing devices. Conventionally, when a peer computing devices is seeding multiple other peer computing devices it allocates a similar amount of its P2P resources to each of the other peer computing devices it is servicing. In certain embodiments, when the second peer computing device $112_2$ agrees to dedicate a disproportionately large amount of its P2P resources to servicing the first peer computing device $112_1$, the second peer computing device $112_2$ dedicates more of its P2P resources to servicing the first peer computing device $112_1$ than to servicing any other single peer computing device. In certain embodiments, when the second peer computing device $112_2$ agrees to dedicate a disproportionately large amount of its P2P resources to servicing the first peer computing device $112_1$, the second peer computing device $112_2$ dedicates at least at least twice as much of its P2P resources to servicing the first peer computing device $112_1$ than to servicing any other single peer computing device. In other embodiments, when the second peer computing device $112_2$ agrees to dedicate a disproportionately large amount of its P2P resources to servicing the first peer computing device $112_1$, the second peer computing device $112_2$ dedicates more of its P2P resources to servicing the first peer computing device $112_1$ than to servicing all other peer computing devices collectively. Other variations are also possible, and within the scope of an embodiment.

As indicated at steps 216 and 218, when a second peer computing device (e.g., $112_2$) receives an aggressive peering request from the first peer computing device $112_1$, the second peer computing device $112_2$ can accept or reject the aggressive peering request. For example, the second peer computing device $112_2$ may accept the aggressive peering request if it is idle, and/or if it has a significant amount of communication bandwidth available. For another example, the second peer computing device $112_2$ may accept an aggressive peering request so long as it is not currently servicing another peer computing device from which it received, and to which it accepted, an aggressive peering request. The second peer computing device $112_2$ may reject an aggressive peering request if accepting such a request would adversely affect a user experience that the second peer computing device $112_2$ is currently providing, or if the second peer computing device $112_2$ is currently servicing another peer computing device from which it received, and accepted, an aggressive peering request. It is also within the scope of an embodiment that a peer computing device use additional and/or other criteria when deciding whether to accept or reject an aggressive peering request.

If the second peer computing device $112_2$ accepts the aggressive peering request, then the second peer computing device $112_2$ can provide an indication of such an acceptance to the first peer computing device $112_1$. In certain embodiments, when the first peer computing device $112_1$ sends the aggressive peering request to the second peer computing device $112_2$, the message that includes the aggressive peering request also identifies the digital content that the first peer computing device $112_1$ desires. In other words, a single message sent from the first peer computing device $112_1$ to the second peer computing device $112_2$ can include both an aggressive peering request and a download request for desired digital content, in which case the message can also be referred to as an aggressive download request. In such embodiments, once the second peer computing device $112_2$ accepts that aggressive peering request, the second peer computing device $112_2$ can immediately begin to upload the desired digital content, or a portion thereof, to the first peer computing device $112_1$. In alternative embodiments, the first peer computing device $112_1$ does not inform the second peer computing device $112_2$ of the digital content desired by the first peer computing device $112_1$ until after first peer computing device $112_1$ receives an indication that the second peer computing device $112_2$ has accepted the aggressive peering request. In other words, the first peer computing device $112_1$ may not send a download request for desired digital content to the second peer computing device $112_2$ until after the first peer computing device $112_1$ receives an indication that the second peer computing device $112_2$ has accepted the aggressive peering request. Either way (assuming that the aggressive peering request was accepted), the second peer computing device $112_2$ can upload the desired digital content, or a portion thereof, to the first peer computing device $112_1$, as indicated at step 220; and the first peer computing device $112_1$ can download the desired digital content, or a portion thereof, from the second peer computing device $112_2$, as indicated at step 222.

In specific embodiments, in response to accepting the aggressive peering request received from the first peer computing device $112_1$, the second peer computing device $112_2$ terminates servicing one or more other peer computing devices that are currently being serviced by the second peer computing device $112_2$, declines one or more requests that the second peer computing device $112_2$ receives to service one or more other peer computing devices (even though the second peer computing device has the capacity to service the one or more other peer computing devices), and/or allocates more bandwidth to servicing the first peer computing device $112_1$ than to servicing one or more other peer computing devices. Where the second peer computing device $112_2$ dedicates substantially all of its P2P resources to the servicing the first peer computing device $112_1$, the second peer computing device $112_2$ terminates servicing all other peer computing devices that are currently being serviced by the second peer computing device $112_2$, declines all other requests that the second peer computing device $112_2$ receives to service other peer computing devices (even though the second peer computing device has the capacity to service other peer computing devices), and allocates no communications bandwidth to servicing any other peer computing device besides the first peer computing device $112_1$.

In specific embodiments, the second peer computing device $112_2$ that accepts an aggressive peering request received from a first peer computing device $112_1$ can attempt to find other peer computing devices that are willing to dedicate substantially all of, or a disproportionately large amount of, its P2P resources to servicing the first peer computing device $112_1$. In other words, the second peer computing device $112_2$ can attempt to recruit further peer computing devices for the benefit of the first peer computing device $112_1$. The second peer computing device $112_2$ can communicate with the central service 152 to identify further at least partially dedicated peer candidates, or the second peer computing device $112_2$ can itself identify the further at least partially dedicated peer candidates. Either way, as indicated at step 224, the second peer computing device $112_2$ can send a secondary aggressive peering request to one or more other peer computing devices. Here, a secondary aggressive peering request can comprise a request that another peer computing device (e.g., a third peer computing device $112_3$), to which the secondary aggressive peering request is addressed, dedicates substantially all of, or a disproportionately large amount of, its P2P resources to servicing the first peer computing device $112_1$.

The second peer computing device $112_2$ may send such a secondary aggressive peering to other peer computing devices, for the benefit of the first peer computing device $112_1$, if the second peer computing device $112_2$ does not have the digital content desired by the first peer computing device, or does not have a portion thereof. In certain embodiments, where the second peer computing device $112_2$ sends a secondary aggressive peering request to a third computing device (e.g., $112_3$), if the secondary aggressive peering request is accepted, the second peer computing device $112_2$ will download digital content from the third computing device $112_3$, so that the first peer computing device $112_1$ can download the digital content from the second peer computing device $112_2$ without having any knowledge that the digital content, or a portion thereof, was obtained from the third peer computing device $112_3$. In alternative embodiments, when the second peer computing device $112_2$ sends a secondary aggressive peering request to the third peer computing device $112_3$, if the secondary aggressive peering request is accepted, the third peer computing device $112_3$ sends a message directly to the first peer computing device $112_1$ identifying itself and informing the first peer computing device $112_1$ that the third peer computing device $112_3$ has desired digital content, or a portion thereof, in case the first peer computing device $112_1$ still desires such digital content. In such alternative embodiments, the second peer computing device $112_2$ can inform the third peer computing device $112_3$ of the identity of the first peer computing device $112_1$ when sending the secondary aggressive peering request to the third peer computing device $112_3$, or after the secondary aggressive peering request is accepted by the third peer computing device $112_3$. The first peer computing device $112_1$ can thereafter send a download request directly to the third peer computing device $112_3$, and can obtain desired digital content, or a portion thereof, directly from the third peer computing device $112_3$.

In a similar manner to that just described above, the third peer computing device $112_3$ may send a tertiary aggressive peering request to other peer computing devices, and so on, so that numerous other peer computing devices dedicate substantially all of, or a disproportionately large amount of, its P2P resources to servicing the first peer computing device $112_1$. This can occur even though many of the other peer computing devices didn't receive an aggressive peering request directly from the first peer computing device $112_1$. In other words, a legion of other peer computing devices can be recruited for the benefit of servicing a single peer computing device.

The period during which a peer computing device is dedicating substantially all of, or a disproportionately large amount of, its P2P resources to servicing a single peer computing device can be referred to as an aggressive peering session. Such an aggressive peering session can be terminated in various different manners. In certain embodiments, once the peer computing device that initiated the aggressive peering session has obtained the desired digital content, it can send messages to other peer computing devices to terminate the aggressive peering. Alternatively, aggressive peering sessions can be automatically terminated after a predetermined amount of time. In other words, aggressive peering session can time-out. The predetermined amount of time can be specified by the central service 152, by the peer computing device that sent the aggressive peering request, by the peer computing device that accepted the aggressive peering request, or by a protocol specifically defined for aggressive peering. In certain embodiments, a peer computing device that has accepted an aggressive peering request may terminate the aggressive peering session in which it is participating if a user of the peer computing device begins to use the peer computing device to play a game, stream a video, or in some other manner that requires the peer computing device to dedicate a substantial portion of its resources to satisfying a user experience. Combinations of the above describe options, or other options for terminating aggressive peering sessions, are also within the scope of an embodiment.

In the flow diagram of FIG. 2, the first peer computing device $112_1$ is only shown as sending an aggressive peering request to one other peer computing device, referred to as the second peer computing device $112_2$ in the above description. However, it is noted that the first peer computing device $112_1$ can actually send aggressive peering requests to multiple other peer computing devices, each of which can accept or reject the request they receive. Further, it is noted that any other peer computing device that accepts an aggressive peering request from the first peer computing device $112_1$ can send a secondary peering request for the benefit of the first peer computing device $112_1$, and so on. In specific embodiments, a peer computing device that has accepted an aggressive peering request can follow instructions for acquiring digital content on behalf of a first peer computing device (e.g., $112_1$) in a specified piece acquisition order.

Figure 3:
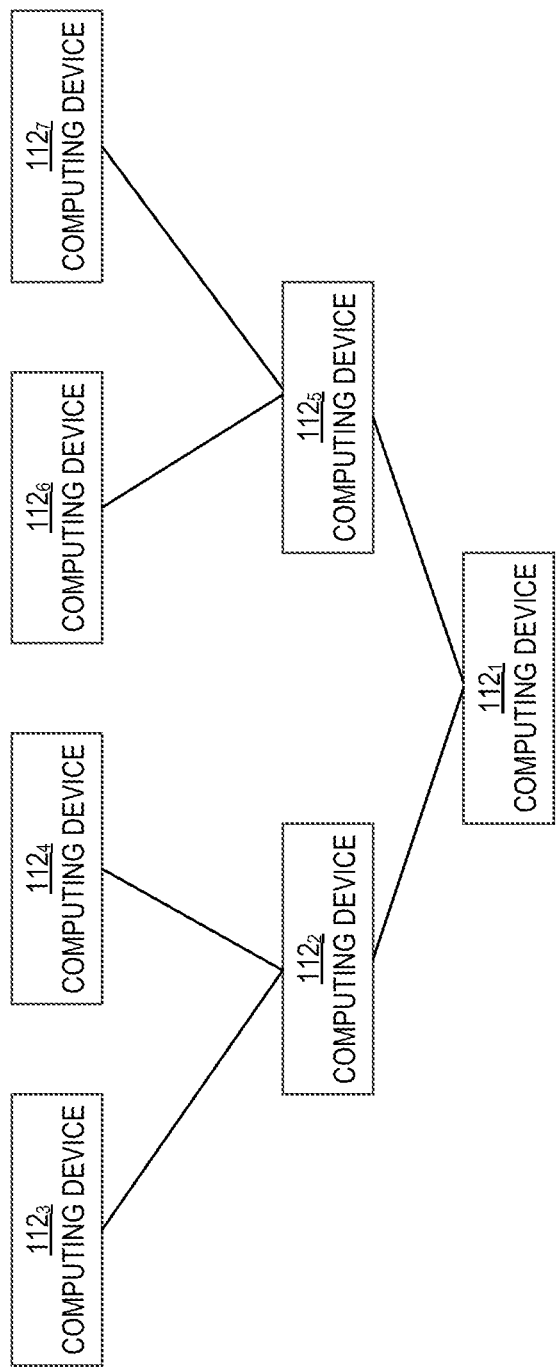
FIG. 3 is a high level block diagram that is used to illustrate how aggressive peering can cause multiple peer computing devices to dedicate substantially all, are a disproportionally large amount of, its P2P resources to servicing a single peer computing device.

FIG. 3 will now be used to illustrate how multiple peer computing devices can each dedicate substantially all of its P2P resources to servicing the first peer computing device $112_1$. In FIG. 3, it is assumed that the first peer computing device $112_1$ sent an aggressive peering request to the second peer computing device $112_2$. When the second peer computing device $112_2$ received the aggressive peering request, it was seeding the fifth peer computing device $112_5$. However, once the second peer computing device $112_2$ received and accepted the aggressive peering request from the first peer computing device $112_1$, the second peer computing device $112_2$ stopped seeding the fifth peer computing device $122_5$, and dedicated all of its P2P resources to servicing the first peer computing device $112_1$. Additionally, the second peer computing device $112_2$ sent secondary aggressive peering requests to the third and fourth peer computing devices $112_3$ and $112_4$, for the benefit of the first peer computing device $112_1$. Similarly, the first peer computing device $112_1$ sent an aggressive peering request to the fifth peer computing device $112_5$, which accepted the aggressive peering request, dedicated all of its P2P resources to servicing the first peer computing device $112_1$, and sent secondary aggressive peering requests to the sixth and seventh peer computing devices $112_6$ and $112_7$, for the benefit of the first peer computing device $112_1$.

FIG. 3 can similarly be used illustrate embodiments where a peer computing device, rather than dedicating substantially all of its P2P resources to the first peer computing device $112_1$, dedicates a disproportionately large amount of its P2P resources to servicing the first peer computing device $112_1$. For example, again assume that the first peer computing device $112_1$ sent an aggressive peering request to the second peer computing device $112_2$. When the second peer computing device $112_2$ received the aggressive peering request, it was seeding the third, fourth and fifth peer computing device $112_3$, $112_4$, $112_5$. However, once the second peer computing device $112_2$ received and accepted the aggressive peering request from the first peer computing device $112_1$, the second peer computing device $112_2$ stopped seeding the fifth peer computing device $122_5$, and dedicated more of its P2P resources to servicing the first peer computing device $112_1$ than to servicing the third and fourth peer computing devices $112_3$, $112_4$ combined. Other ways of dedicating a disproportionately large amount of P2P resources to servicing a single peer computing device 112 were described above.

In the flow diagram of FIG. 2, and the block diagram of FIG. 3, the peer computing device referred to as the first peer computing device (and referenced in the FIGS. as $112_1$) has generally been described as the peer computing device that sent of aggressive peering requests. It is noted that this was done for sake of convenience and consistency. However, it should be understood that the same peer computing device that sends aggressive peering requests at one point in time can also accept an aggressive peering request at another point in time. For example, the first peer computing device $112_1$ can at one point in time send aggressive peering requests, and can at a later time accept an aggressive peering request from another peer computing device (e.g., a third peer computing device $112_3$). Continuing with this example, once the first peer computing device $112_1$ accepts an aggressive peering request from the third peer computing device $112_3$, the first peer computing device $112_1$ can send a secondary aggressive peering request to other peer computing devices (e.g., fourth and fifth peer computing device $112_4$, $112_5$) for the benefit of the third peer computing device $112_3$.

In the above described embodiments, the central service 152 was described as being responsible for accessing information at step 206 and identifying at least partially dedicated peer candidates at step 208. In alternative embodiments, a peer computing device 112 can perform these steps itself, in which cases certain steps (e.g., 202, 204, 210 and 212) associated with communications between the first peer computing device $112_1$ and the central service 152 need not be performed. In still other embodiments, the coordinator 142 (e.g., a tracker) can perform all (or some) of the steps that were described as being performed by the central service 152. It is also possible, and within the scope of an embodiment, that the central service 152, the coordinator 142 and the peer computing devices 112 divide up the steps described with reference to FIG. 2 in alternative manners then were described above.

As can be appreciated from the above description, aggressive peering techniques described herein can be used to increase download throughput in a P2P network.

Uninterrupted Seeding

As mentioned above, certain embodiments described herein relate to identifying peer computing devices that are predicted to be available as an uninterrupted seed. Such embodiments can be used to increase download throughput in a P2P network by reducing the likelihood that a computing device will stop acting as a seed in the middle of a downloading session. The high level flow diagram of FIG. 4, discussed below, is used to explain these embodiments.

Figure 4:
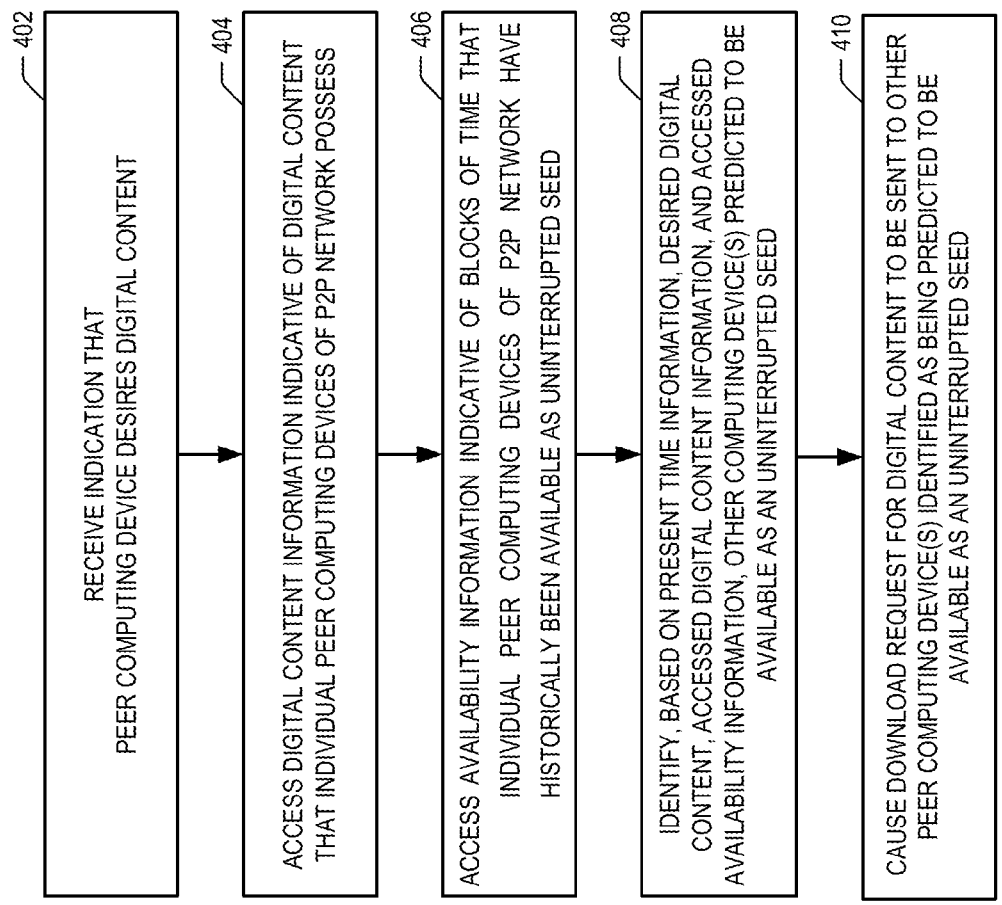
FIG. 4 shows a flow diagram depicting an embodiment of a method for improving download throughput in a P2P network through use of uninterrupted seeds.

Referring to FIG. 4, this method can be initiated when a first peer computing device (e.g., $112_1$ in FIG. 1) indicates a desire to obtain digital content, and sends such an indication to a central service (e.g., 152 in FIG. 1). The desired digital content can either be an entire digital content item that includes a plurality of digital content portions (also referred to as digital content units), a specific digital content portion of a digital content item that includes a plurality of digital content portions, or a specific group of digital content portions of a digital content item. In specific embodiments, the steps described with reference to FIG. 4 are performed by the central service 152. Unless stated otherwise, it is assumed that this is the case, i.e., that the central service 152 performs that steps in FIG. 4.

As indicated at step 402, the central service 152 receives an indication from a first peer computing device (e.g., $112_1$) that the first peer computing device $112_1$ desires digital content. At step 404, the central service 152 accesses digital content information indicative of digital content that individual peer computing devices of the P2P network possess. At step 406, the central service 152 accesses availability information indicative of blocks of time that individual peer computing devices of the P2P network have historically been available as an uninterrupted seed. A peer computing device can be considered an uninterrupted seed when it uploads digital content, to one or more other peer computing devices, for an uninterrupted block of time. As discussed in additional detail below, the length of the uninterrupted block of time can be predetermined, or be dynamic, depending upon implementation. In certain embodiments, the information accessed at steps 404 and 406 is collected and maintained by the central service 152. In other embodiments, multiple coordinators (e.g., 142 in FIG. 1) can collect subsets of such information corresponding to subsets of the peer computing devices, provide such information the central service 152, and the central service 152 can aggregate and store the information it receives. It is also possible that individual peer computing devices 112 collect and maintain such information for their own use.

For a specific example, the central service 152 can communicate with coordinators 142 and/or individual peer computing devices 112 to monitor and keep track of the digital content that the various peer computing devices 112 have and are willing to share with other peer computing devices 112. Additionally, the central service 152 can monitor and keep track of availability information indicative of blocks of time that individual peer computing devices of the P2P network have historically been available as an uninterrupted seed. Based on such availability information, the central service 152 can predict when peer computing device(s) are available as uninterrupted seeds for at least the specified amount of time. The aforementioned types of information, including information indicative of the aforementioned predictions, can be stored in memory and/or database(s) accessible by the central service 152.

At step 408, the central service 152 identifies, based on present time information, the desired digital content, the accessed digital content information, and the accessed availability information, one or more other computing devices that are predicted to be available as an uninterrupted seed for at least a portion of the desired digital content. The present time information can include, for example, the present time of day (e.g., including hour and minute), the present day of the week and/or present day of the year, but is not limited thereto.

The central service 152 can also keep track of current and/or historical throughput information indicative of data transfers rates provided by individual peer computing devices of the P2P network, in which case such information can be used to prioritize or select among multiple peer computing devices that are predicted to be available as an uninterrupted seed. For example, it may be predicted that a second peer computing device (e.g., $112_2$) will be available as an uninterrupted seed for the next 30 minutes, and that a third peer computing device (e.g., $112_3$) will be available as an uninterrupted seed for the next 50 minutes. However, if the data transfer rate provided by the third peer computing device $112_3$ is twice as fast as the data transfer rate provided by the second peer computing device $112_2$, then it could be predicted the first peer computing device can download more digital content from the second peer computing device $112_2$ during a 30 minute uninterrupted block of time, than it could from the third peer computing device $112_3$ during a 50 minute uninterrupted block of time. Accordingly, in this example the second peer computing device $112_2$ may be identified as a preferred predicted uninterrupted seed, and the third peer computing device $112_3$ may be identified as the second best predicted uninterrupted seed.

In specific embodiments, in order to be identified as a peer computing device that is predicted to be available as an uninterrupted seed, it must be predicted that the peer computing device will be available as an uninterrupted seed for at least a specified amount of time. Such a specified amount of time can be predetermined (e.g., 10 minutes), or can depend on the magnitude of the desired digital content (or a portion thereof) that is going to be downloaded from the peer computing device that will be acting as a seed. For example, the greater the size of the digital content, the greater the specified amount of time, and vice versa.

At step 410, the central service 152 causes a download request for digital content to be sent from the first peer computing device $112_1$ to at least one of the other peer computing devices identified as being predicted to be available as an uninterrupted seed for at least a portion of the desired digital content. For example, at step 410 the central service 152 can inform the first peer computing device $112_1$ of one or more other peer computing devices that were identified at step 408. The central service 152 can perform step 410 by sending a message including such information to the first peer computing device $112_1$. Such a message can include an instruction or recommendation that the first peer computing device $112_1$ send a download request (which may or may not include an aggressive peering request) to one or more other peer computing devices that were predicted to be available as an uninterrupted seed for at least a portion of the desired digital content. In this manner, the central service 152 can cause the first peer computing device $112_1$ to send an aggressive peering request to one or more other peer computing devices.

Figure 5:
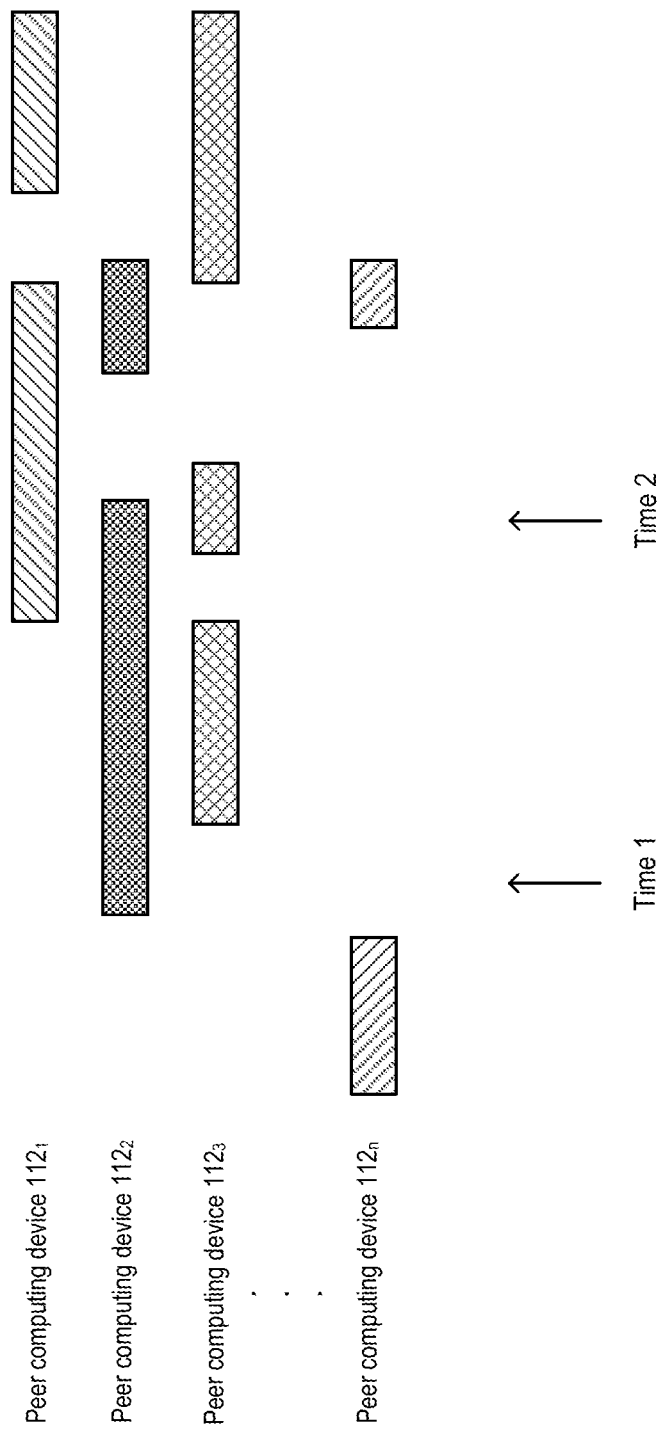
FIG. 5 is a diagram that illustrates blocks time that peer computing devices of a P2P network have historically been available as uninterrupted seeds.

FIG. 5 is an exemplary diagram that is used illustrate blocks time that peer computing devices 112 of a P2P network have historically been available as uninterrupted seeds. Depending upon the time at which a peer computing device desires digital content, other peer computing devices can be identified (e.g., by the central service 152) as candidates for being an uninterrupted seed. For example, it can be appreciated from FIG. 5 that at "time 1", there is only one peer computing device (i.e., $112_3$) that is predicted to be available as an uninterrupted seed. However, at "time 2" there are three peer computing devices that are predicted to be available as an interrupted seed for at least some length of time. Depending upon the amount of digital content desired, as well as on predicted digital data transfer rates, the three potential uninterrupted seeds can be prioritized.

In the above described embodiments, the central service 152 was described as being responsible for performing the steps described with reference to FIG. 4. In alternative embodiments, a peer computing device 112 can perform these steps itself, in which cases certain steps associated with communications between the first peer computing device $112_1$ and the central service 152 may not be performed. In still other embodiments, the coordinator 142 (e.g., a tracker) can perform all (or some) of the steps that were described as being performed by the central service 152. It is also possible, and within the scope of an embodiment, that the central service 152, the coordinator 142 and the peer computing devices 112 divide up the steps described with reference to FIG. 4 in alternative manners than were described above.

As can be appreciated from the above description, uninterrupted peering techniques described herein can be used to increase download throughput in a P2P network.

Exemplary Computing Device

Figure 6:
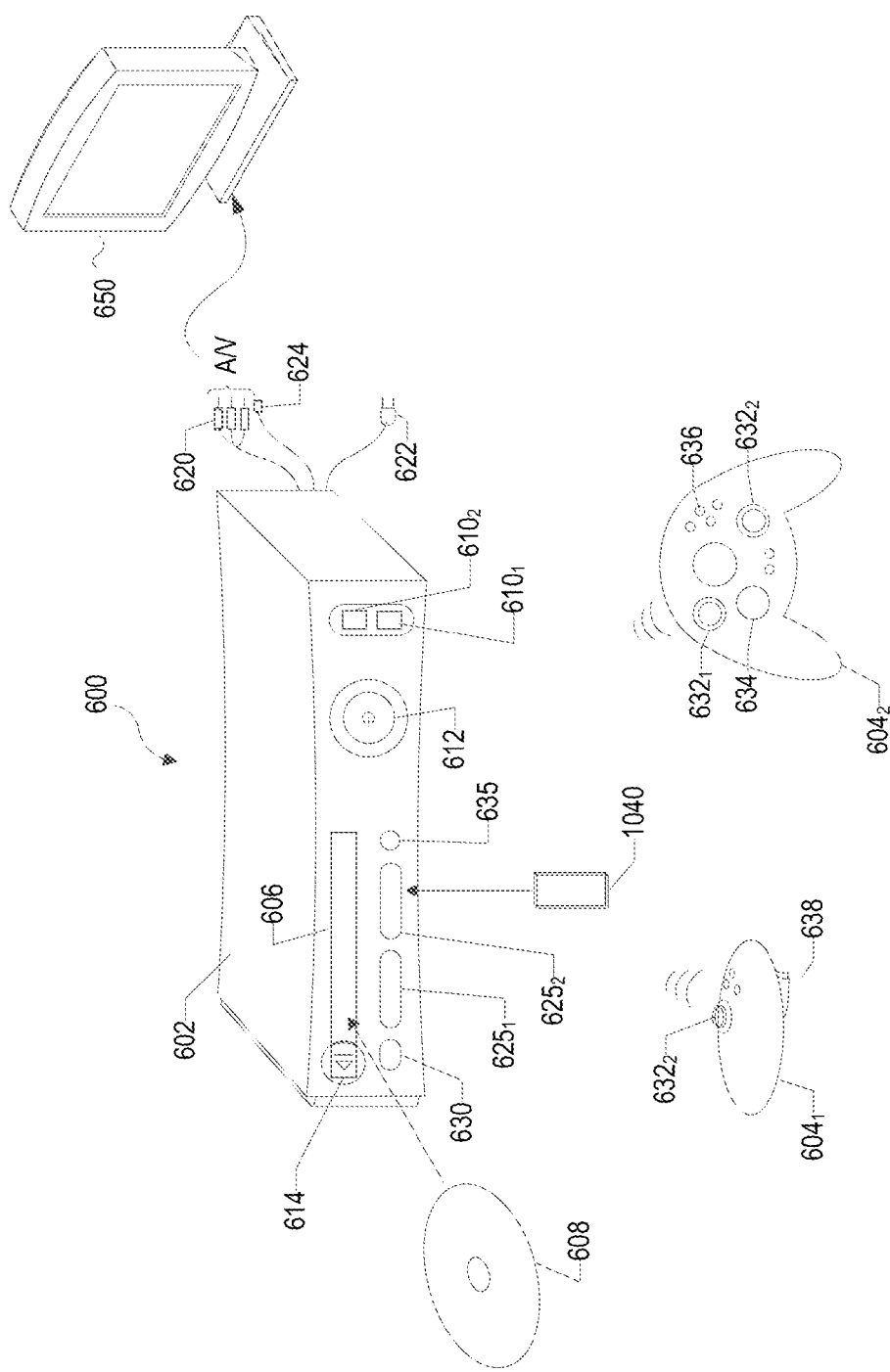
FIG. 6 is an isometric view of an exemplary gaming and media system.

As mentioned above, one or more of the computing devices 112 can be, but is not limited to, a video game console. FIG. 6 will now be used to describe an exemplary video game and media console, or more generally, will be used to describe an exemplary gaming and media system 600 that includes a game and media console. The following discussion of FIG. 6 is intended to provide a brief, general description of a suitable computing device with which concepts presented herein may be implemented. It is understood that the system of FIG. 6 is by way of example only. In further examples, embodiments describe herein may be implemented using a variety of client computing devices, either via a browser application or a software application resident on and executed by the client computing device. As shown in FIG. 6, a gaming and media system 600 includes a game and media console (hereinafter "console") 602. In general, the console 602 is one type of client computing device. The console 602 is configured to accommodate one or more wireless controllers, as represented by controllers $604_1$ and $604_2$. The console 602 is equipped with an internal hard disk drive (not shown) and a portable media drive 606 that support various forms of portable storage media, as represented by an optical storage disc 608. Examples of suitable portable storage media include DVD, CD-ROM, game discs, and so forth. The console 602 also includes two memory unit card receptacles $625_1$ and $625_2$, for receiving removable flash-type memory units 640. A command button 635 on the console 602 enables and disables wireless peripheral support.

As depicted in FIG. 6, the console 602 also includes an optical port 630 for communicating wirelessly with one or more devices and two USB (Universal Serial Bus) ports $610_1$ and $610_2$ to support a wired connection for additional controllers, or other peripherals. In some implementations, the number and arrangement of additional ports may be modified. A power button 612 and an eject button 614 are also positioned on the front face of the game console 602. The power button 612 is selected to apply power to the game console, and can also provide access to other features and controls, and the eject button 614 alternately opens and closes the tray of a portable media drive 606 to enable insertion and extraction of a storage disc 608.

The console 602 connects to a television or other display (such as monitor 650) via A/V interfacing cables 620. In one implementation, the console 602 is equipped with a dedicated A/V port (not shown) configured for content-secured digital communication using A/V cables 620 (e.g., A/V cables suitable for coupling to a High Definition Multimedia Interface "HDMI" port on a high definition monitor 650 or other display device). A power cable 622 provides power to the game console. The console 602 may be further configured with broadband capabilities, as represented by a cable or modem connector 624 to facilitate access to a network, such as the Internet. The broadband capabilities can also be provided wirelessly, through a broadband network such as a wireless fidelity (Wi-Fi) network.

Each controller 604 is coupled to the console 602 via a wired or wireless interface. In the illustrated implementation, the controllers 604 are USB-compatible and are coupled to the console 602 via a wireless or USB port 610. The console 602 may be equipped with any of a wide variety of user interaction mechanisms. In an example illustrated in FIG. 6, each controller 604 is equipped with two thumbsticks $632_1$ and $632_2$, a D-pad 634, buttons 636, and two triggers 638. These controllers are merely representative, and other known gaming controllers may be substituted for, or added to, those shown in FIG. 6.

In one implementation, a memory unit (MU) 640 may also be inserted into the controller 604 to provide additional and portable storage. Portable MUs enable users to store game parameters for use when playing on other consoles. In this implementation, each controller is configured to accommodate two MUs 640, although more or less than two MUs may also be employed.

The gaming and media system 600 is generally configured for playing games stored on a memory medium, as well as for downloading and playing games, and reproducing pre-recorded music and videos, from both electronic and hard media sources. With the different storage offerings, titles can be played from the hard drive, from an optical disk media (e.g., 608), from an online source, or from MU 640. Samples of the types of media that gaming and media system 600 is capable of playing include:

- Game titles played from CD and DVD discs, from the hard disk drive, or from an online source.
- Digital music played from a CD in portable media drive 606, from a file on the hard disk drive (e.g., music in the Windows Media Audio (WMA) format), or from online streaming sources.
- Digital audio/video played from a DVD disc in portable media drive 606, from a file on the hard disk drive (e.g., Active Streaming Format), or from online streaming sources.

During operation, the console 602 is configured to receive input from controllers 604 and display information on the display 650. For example, the console 602 can display a user interface on the display 650 to allow a user to select a game using the controller 604 and display state solvability information as discussed below.

Figure 7:
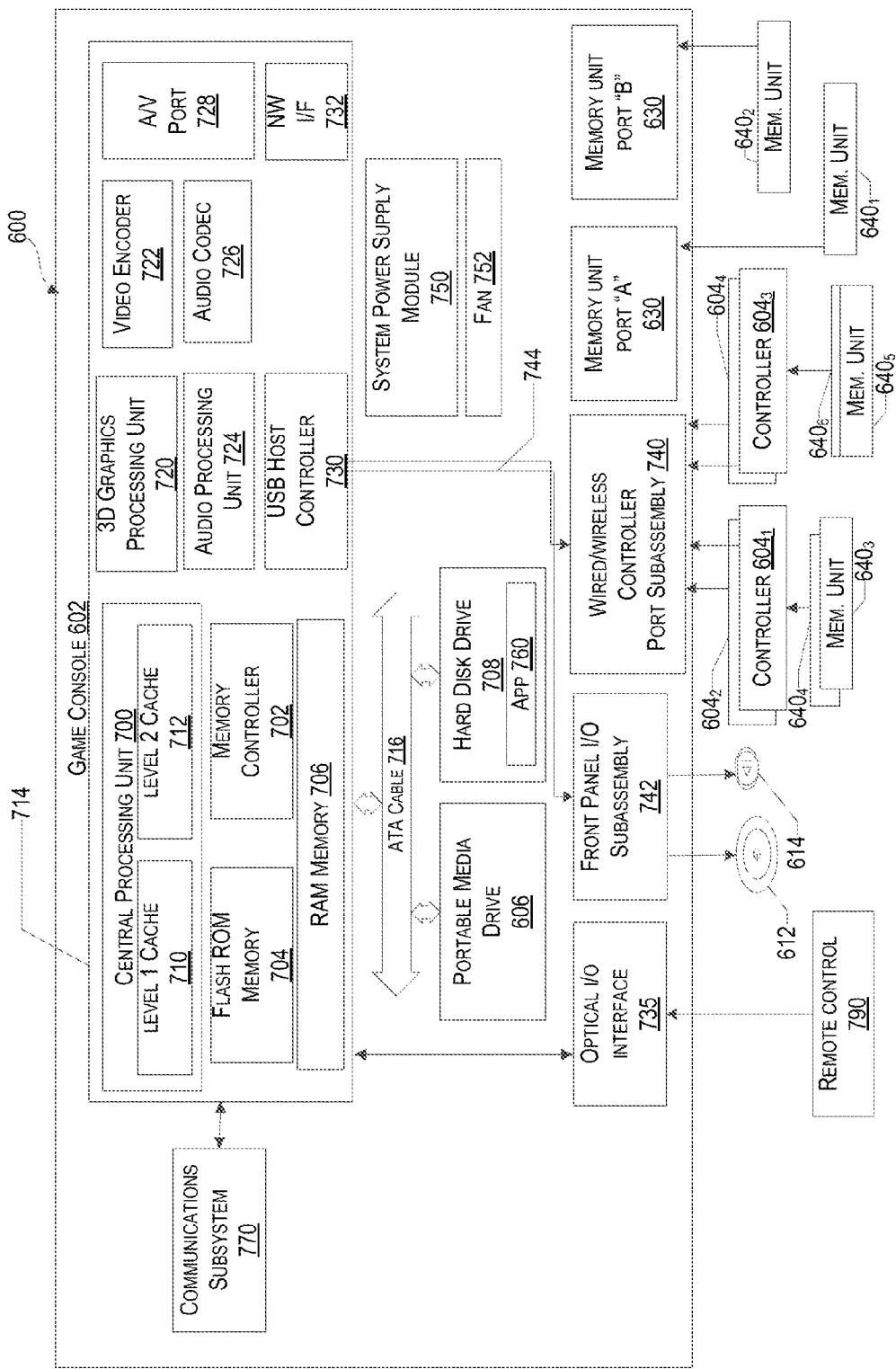
FIG. 7 is an exemplary functional block diagram of components of the gaming and media system shown in FIG. 6.

FIG. 7 is a functional block diagram of the gaming and media system 600 and shows functional components of the gaming and media system 600 in more detail. The console 602 has a central processing unit (CPU) 700, and a memory controller 702 that facilitates processor access to various types of memory, including a flash Read Only Memory (ROM) 704, a Random Access Memory (RAM) 706, a hard disk drive 708, and the portable media drive 606. In one implementation, the CPU 700 includes a level 1 cache 710 and a level 2 cache 712, to temporarily store data and hence reduce the number of memory access cycles made to the hard drive 708, thereby improving processing speed and throughput.

The CPU 700, the memory controller 702, and various memory devices are interconnected via one or more buses (not shown). The details of the bus that is used in this implementation are not particularly relevant to understanding the subject matter of interest being discussed herein. However, it will be understood that such a bus might include one or more of serial and parallel buses, a memory bus, a peripheral bus, and a processor or local bus, using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

In one implementation, the CPU 700, the memory controller 702, the ROM 704, and the RAM 706 are integrated onto a common module 714. In this implementation, the ROM 704 is configured as a flash ROM that is connected to the memory controller 702 via a PCI bus and a ROM bus (neither of which are shown). The RAM 706 is configured as multiple Double Data Rate Synchronous Dynamic RAM (DDR SDRAM) modules that are independently controlled by the memory controller 702 via separate buses (not shown). The hard disk drive 708 and the portable media drive 606 are shown connected to the memory controller 702 via the PCI bus and an AT Attachment (ATA) bus 716. However, in other implementations, dedicated data bus structures of different types can also be applied in the alternative.

A three-dimensional graphics processing unit 720 and a video encoder 722 form a video processing pipeline for high speed and high resolution (e.g., High Definition) graphics processing. Data are carried from the graphics processing unit 720 to the video encoder 722 via a digital video bus (not shown). An audio processing unit 724 and an audio codec (coder/decoder) 726 form a corresponding audio processing pipeline for multi-channel audio processing of various digital audio formats. Audio data are carried between the audio processing unit 724 and the audio codec 726 via a communication link (not shown). The video and audio processing pipelines output data to an A/V (audio/video) port 728 for transmission to a television or other display. In the illustrated implementation, the video and audio processing components 720-728 are mounted on the module 714.

FIG. 7 shows the module 714 including a USB host controller 730 and a network interface 732. The USB host controller 730 is shown in communication with the CPU 700 and the memory controller 702 via a bus (e.g., PCI bus) and serves as host for the peripheral controllers $604_1$-$604_4$. The network interface 732 provides access to a network (e.g., Internet, home network, etc.) and may be any of a wide variety of various wire or wireless interface components including an Ethernet card, a modem, a wireless access card, a Bluetooth module, a cable modem, and the like.

In the implementation depicted in FIG. 7, the console 602 includes a controller support subassembly 740 for supporting the four controllers $604_1$-$604_4$. The controller support subassembly 740 includes any hardware and software components to support wired and wireless operation with an external control device, such as for example, a media and game controller. A front panel I/O subassembly 742 supports the multiple functionalities of power button 612, the eject button 614, as well as any LEDs (light emitting diodes) or other indicators exposed on the outer surface of console 602. Subassemblies 740 and 742 are in communication with the module 714 via one or more cable assemblies 744. In other implementations, the console 602 can include additional controller subassemblies. The illustrated implementation also shows an optical I/O interface 735 that is configured to send and receive signals that can be communicated to the module 714.

The MUs $640_1$ and $640_2$ are illustrated as being connectable to MU ports "A" $630_1$ and "B" $630_2$ respectively. Additional MUs (e.g., MUs $640_3$-$640_6$) are illustrated as being connectable to the controllers $604_1$ and $604_3$, i.e., two MUs for each controller. The controllers $604_2$ and $604_4$ can also be configured to receive MUs (not shown). Each MU 640 offers additional storage on which games, game parameters, and other data may be stored. In some implementations, the other data can include any of a digital game component, an executable gaming application, an instruction set for expanding a gaming application, and a media file. When inserted into the console 602 or a controller, the MU 640 can be accessed by the memory controller 702.

A system power supply module 750 provides power to the components of the gaming system 600. A fan 752 cools the circuitry within the console 602.

An application 760 comprising machine instructions is stored on the hard disk drive 708. When the console 602 is powered on, various portions of the application 760 are loaded into RAM 706, and/or caches 710 and 712, for execution on the CPU 700, wherein the application 760 is one such example. Various applications can be stored on the hard disk drive 708 for execution on CPU 700.

The console 602 is also shown as including a communication subsystem 770 configured to communicatively couple the console 602 with one or more other computing devices (e.g., other consoles). The communication subsystem 770 may include wired and/or wireless communication devices compatible with one or more different communication protocols. As non-limiting examples, the communication subsystem 770 may be configured for communication via a wireless telephone network, or a wired or wireless local- or wide-area network. In some embodiments, the communication subsystem 770 may allow the console 602 to send and/or receive messages to and/or from other devices via a network such as the Internet. In specific embodiments, the communication subsystem 770 can be used to communicate with a coordinator and/or other computing devices, for sending download requests, and for effecting downloading and uploading of digital content. More generally, the communication subsystem 770 can enable the console 602 to participate on P2P communications.

The gaming and media system 600 may be operated as a standalone system by simply connecting the system to monitor 650 (FIG. 6), a television, a video projector, or other display device. In this standalone mode, the gaming and media system 600 enables one or more players to play games, or enjoy digital media, e.g., by watching movies, or listening to music. However, with the integration of broadband connectivity made available through network interface 732, or more generally the communication subsystem 770, the gaming and media system 600 may further be operated as a participant in a larger network gaming community, such as a P2P network, as discussed above in connection with FIG. 1.

The above described gaming and media console 602 is just one example of the computing devices 112 discussed above with reference to FIG. 1 and various other FIGS. As was explained above, there are various other types of computing devices with which embodiments described herein can be used.

The terms "module" and "program" may be used to describe an aspect of a computing device or system implemented to perform a particular function. It will be understood that different modules and/or programs may be instantiated from the same application, service, code block, object, library, routine, API, function, etc. Likewise, the same module and/or program may be instantiated by different applications, services, code blocks, objects, routines, APIs, functions, etc. The terms "module" and "program" may encompass individual or groups of executable files, data files, libraries, drivers, scripts, database records, etc.

The phrase "based on" as used herein, unless specified otherwise, means "based at least in part on". Accordingly, a decision that is "based on" specified information may also be based on additional information.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed. For example, the subject matter of the present disclosure also includes all combinations and subcombinations of the various routines and methods, systems and configurations, and other features, functions, acts, and/or properties disclosed herein, as well as any and all equivalents thereof.

The foregoing detailed description of the inventive system has been presented for purposes of illustration and description. It is not intended to be exhaustive or to limit the inventive system to the precise form disclosed. Many modifications and variations are possible in light of the above teaching. The described embodiments were chosen in order to best explain the principles of the inventive system and its practical application to thereby enable others skilled in the art to best utilize the inventive system in various embodiments and with various modifications as are suited to the particular use contemplated. It is intended that the scope of the inventive system be defined by the claims appended hereto.

What is claimed is:

1. A central service for a peer-to-peer (P2P) network that includes a plurality of peer computing devices, the central service comprising:
   an interface that receives, from a first peer computing device of the P2P network, an indication that the first peer computing device desires digital content;
   one or more processors that identify, for the first peer computing device, one or more other peer computing devices of the P2P network that are candidates for dedicating substantially all of, or a disproportionately large amount of, the other peer computing device's P2P resources to servicing the first peer computing device, wherein said P2P resources are resources that a said peer computing device uses for P2P communications; and
   wherein the one or more processors also effect or recommend that the first peer computing device send an aggressive peering request to at least one of the other peer computing devices that are identified as candidates for dedicating substantially all of, or a disproportionately large amount of, the other peer computing device's P2P resources to servicing the first peer computing device;
   wherein each said aggressive peering request comprises a request that one of the other peer computing devices dedicates substantially all of, or a disproportionately large amount of, the other peer computing device's P2P resources to servicing the first peer computing device.

2. The central service of claim 1, wherein the one or more processors also determine whether the first peer computing device is authorized to send an aggressive peering request, prior to the effecting or recommending that the first peer computing device send an aggressive peering request.

3. The central service of claim 1, wherein the one or more processors determine whether the first peer computing device is authorized to send an aggressive peering request based on the first peer computing device's need for the desired digital content.

4. The central service of claim 1, wherein the one or more processors determine whether the first peer computing device is authorized to send an aggressive peering request based on a service level of the first peer computing device.

5. The central service of claim 1, wherein the one or more processors determine whether the first peer computing device is authorized to send an aggressive peering request based on one or more monetary payments made by a user of the first peer computing device.

6. For use by a central service of a peer-to-peer (P2P) network that includes a plurality of peer computing devices, a method for improving download throughput in the P2P network, the method comprising:
   receiving from a first peer computing device of the P2P network, an indication that the first peer computing device desires digital content;
   determining whether the first peer computing device is authorized to send an aggressive peering request;
   if there is a determination that the first peer computing device is authorized to send an aggressive peering request, then
      identifying, for the first peer computing device, one or more other peer computing devices of the P2P network that are candidates for dedicating substantially all of, or a disproportionately large amount of, the other peer computing device's P2P resources to servicing the first peer computing device, wherein said P2P resources are resources that a said peer computing device uses for P2P communications, and
      effecting or recommending that the first peer computing device send an aggressive peering request to at least one of the other peer computing devices that are identified as candidates for dedicating substantially all of, or a disproportionately large amount of, the other peer computing device's P2P resources to servicing the first peer computing device;
   wherein each said aggressive peering request comprises a request that one of the other peer computing devices dedicates substantially all of, or a disproportionately large amount of, the other peer computing device's P2P resources to servicing the first peer computing device.

7. The method of claim 6, wherein the determining whether the first peer computing device is authorized to send an aggressive peering request is based on a service level of the first peer computing device.

8. The method of claim 6, wherein the determining whether the first peer computing device is authorized to send an aggressive peering request is based on an immediacy of the first peer computing device's need for the desired digital content.

9. The method of claim 8, wherein the determining whether the first peer computing device is authorized to send an aggressive peering request comprises determining that the first peer computing device is authorized to send an aggressive peering request if the first peer computing device needs the desired digital content with an immediacy that if not achieved, would degrade a user experience below a predetermined acceptable level.

10. The method of claim 6, wherein the determining whether the first peer computing device is authorized to send an aggressive peering request is based on contributions to the P2P network made by the first peer computing device.

11. The method of claim 6, wherein the determining whether the first peer computing device is authorized to send an aggressive peering request is based on one or more monetary payments made by a user of the first peer computing device.

12. The method of claim 6, wherein the determining whether the first peer computing device is authorized to send an aggressive peering request is based on how many aggressive peering requests were accepted by the first peer computing device.

13. For use by a central service of a peer-to-peer (P2P) network that includes a plurality of peer computing devices, a method for improving download throughput in the P2P network, the method comprising:
   accessing digital content information indicative of digital content that individual peer computing devices of the P2P network possess;
   accessing availability information indicative of blocks of time that individual peer computing devices of the P2P network have historically been available as an uninterrupted seed;
   receiving an indication that one of the peer computing device desires digital content;
   identifying, based on present time information, the desired digital content, the accessed digital content information, and the accessed availability information, one or more other computing devices that are predicted to be available as an uninterrupted seed for at least a portion of the desired digital content; and
   informing the one of the peer computing devices, from which the indication was received, of at least one of the other peer computing devices identified as being predicted to be available as an uninterrupted seed for at least a portion of the desired digital content.

14. The method of claim 13, further comprising:
accessing throughput information, indicative of data transfers rates that individual computing devices of the P2P network have historically provided;
wherein the identifying one or more other computing devices that are predicted to be available as an uninterrupted seed for at least a portion of the desired digital content, is also based on the throughput information.

15. The method claim 13, wherein the present time information includes present hour and minute information.

16. The method of claim 13, further comprising:
effecting or recommending that the one of the peer computing devices to send a download request for at least a portion of the desired digital content to at least one of the other peer computing devices identified as being predicted to be available as an uninterrupted seed for at least a portion of the desired digital content.

17. The method of claim 13, wherein at least one download request comprises an aggressive download request that includes an aggressive peering request, wherein each aggressive peering request comprises a request that the other peer computing device, to which the aggressive peering request is sent, dedicates substantially all of, or a disproportionately large amount of, the other peer computing device's P2P resources to servicing the peer computing device.

18. The method of claim 13, wherein in order for one or more other computing devices to be identified as being predicted to be available as an uninterrupted seed, the one or more other computing devices must be predicted to be available as an uninterrupted seed for at least a specified amount of time.

19. The method of claim 18, wherein the specified amount of time is determined in dependence on a magnitude of the desired digital content.

* * * * *